(12) United States Patent
Ishiyama et al.

(10) Patent No.: US 7,366,785 B2
(45) Date of Patent: Apr. 29, 2008

(54) COMMUNICATION CONTROL APPARATUS, COMMUNICATION CONTROL METHOD AND COMMUNICATION CONTROL PROGRAM PRODUCT

(75) Inventors: Masahiro Ishiyama, Tokyo (JP); Tatsuya Jimmei, Kanagawa (JP); Yuzo Tamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 903 days.

(21) Appl. No.: 10/740,440

(22) Filed: Dec. 22, 2003

(65) Prior Publication Data
US 2004/0205762 A1 Oct. 14, 2004

(30) Foreign Application Priority Data
Feb. 24, 2003 (JP) ............................. 2003-045957

(51) Int. Cl.
*G06F 15/16* (2006.01)
(52) U.S. Cl. .................. 709/229; 370/230.1; 370/412; 370/235; 370/395.21
(58) Field of Classification Search ................ 709/229, 709/232, 238; 370/230.1, 412, 395.21, 235, 370/352, 414
See application file for complete search history.

(56) References Cited

U.S. PATENT DOCUMENTS

| | | | |
|---|---|---|---|
| 6,744,767 B1 * | 6/2004 | Chiu et al. ............. | 370/395.21 |
| 6,834,310 B2 * | 12/2004 | Munger et al. ............. | 709/232 |
| 6,940,814 B1 * | 9/2005 | Hoffman ...................... | 370/235 |
| 7,170,903 B2 * | 1/2007 | Alasti et al. ................. | 370/414 |
| 7,203,170 B2 * | 4/2007 | Dooley ........................ | 370/235 |
| 7,215,637 B1 * | 5/2007 | Ferguson et al. ........ | 370/230.1 |
| 7,260,085 B2 * | 8/2007 | Dobbins et al. ............ | 370/352 |
| 2002/0023160 A1 * | 2/2002 | Garrett et al. .............. | 709/229 |
| 2003/0103514 A1 * | 6/2003 | Nam et al. ................... | 370/412 |

FOREIGN PATENT DOCUMENTS

JP 2002-158699 5/2002

* cited by examiner

*Primary Examiner*—Dustin Nguyen
(74) *Attorney, Agent, or Firm*—Oblon, Spivak, McClelland, Maier & Neustadt, P.C.

(57) ABSTRACT

A communication control apparatus includes a storage device configured to store corresponding weighted values for each of a plurality of predetermined portions of a sender address, a connection request receiver configured to receive a connection request packet including a connection request, a weight detector configured to obtain a weighted value corresponding to a part of the sender address assigned to the connection request packet from among the weighted values stored in the storage device, a connection controller configured to reject the connection request, when the obtained weighted value exceeds a predetermined value, by determining that a communication apparatus consumes more than a predetermined amount of a resource and discarding the connection request packet, and allow the connection request when the obtained weighted value falls within a predetermined range that is lower than the predetermined value, a weight updater configured to update the weighted values, and a packet transmitter.

11 Claims, 9 Drawing Sheets

| RESOURCE CATEGORY | NUMBER OF SEGMENTS | SPLIT POSITIONS | | |
|---|---|---|---|---|
| | | P1 (48) | P2 (64) | P3 (128) |
| TCP | 3 | | | |

(b)

| CURRENT WEIGHT OF SEGMENTS | | |
|---|---|---|
| 1 | 2 | 3 |

| WEIGHTING VARIABLES (TIMES) FOR SEGMENTS | | |
|---|---|---|
| 1 | 1 | 2 |

(c)

| WEIGHTS AFTER WEIGHT INCREASE | | |
|---|---|---|
| 1 | 2 | 6 |

FIG. 6

| | WEIGHT | PROCESS |
|---|---|---|
| REFERENCE VALUE OR GREATER | GREATER THAN REFERENCE VALUE | ABANDON |
| REFERENCE VALUE OR SMALLER | WEIGHT DIFFERENCE DURING UNIT HOUR IS LARGE | LARGE DELAY |
| | LARGER THAN CURRENT AVERAGE WEIGHT | SMALL DELAY |

FIG. 9

| WEIGHT RECEPTION HISTORY | WEIGHT (P1 : P2 : P3) |
|:---:|:---:|
| 15 : 00 | (1 : 1 : 1) |
| 15 : 01 | (1 : 1 : 2) |
| 15 : 02 | (1 : 1 : 4) |

COMMUNICATION CONTROL APPARATUS, COMMUNICATION CONTROL METHOD AND COMMUNICATION CONTROL PROGRAM PRODUCT

RELATED APPLICATIONS

The present disclosure relates to the subject matter contained in Japanese Patent Application No. 2003-045957 filed on Feb. 24, 2003, which is incorporated herein by reference in its entirety.

BACKGROUND OF THE INVENTION

1. Field of the Invention

The present invention relates to a communication control apparatus, a communication control method and a communication control program product, to restrict the processing of inappropriate connection requests in an environment in which IPv6 addresses are used.

2. Description of the Related Art

The largest computer network, i.e., the Internet, can be accessed and employed worldwide by the public to utilize information and services, provided by a variety of companies for users having Internet access, and to develop new businesses. As a result, a progress made in Internet development and the advancement of new Internet usage techniques has become remarkable. In the Internet, each terminal has an identifier, an IP address that is used for exchanging packets. As an example, pursuant to Transmission Control Protocol (TCP) (see IETF RFC793 Transmission Control Protocol, Darpa Internet Program, Protocol Specification, September, 1981), four items are required to identify a connection, i.e., for a transmitter and receiver connection, an IP address and a port number are required for each terminal. And since TCP is a connection type protocol, these four items, at the least, must be stored in each terminal when a TCP connection is established. Thus, a malicious user may be able to employ the characteristic arrangement to establish an illegal connection, and to mount an attack to deplete the hardware and software resources (hereinafter referred to simply as resources) of a target terminal.

According to the currently employed Internet Protocol version 4 (IPv4), the address space is configured in 32 bits, and as the address is depleted, the number of addresses available for allocation for each user became drastically reduced. Therefore, for the same IP address, the number of available accesses is limited to prevent a resource depleting attack.

Recently, however, Internet protocol version 6 (IPv6) (see IETF RFC2460 Internet Protocol, Version 6(IPv6) Specification, December, 1998) has been developed and put into practical use, and for IPv6 the address space has been expanded to 128 bits.

Since for IPv6 the address space has been expanded to 128 bits, a network can accommodate 64-bit addresses when IPv6 is used. But while, for IPv6, the use of this wide address space confers many advantages, the size of the address space facilitates its effective use by an malicious user. That is, when the malicious user is able to connect his or her terminal connected to a specific network, by using the address width, substantially 64 bits, the user can attempt to attack on a target terminal. Further, since according to IPv6 an individual terminal is permitted to accommodate a plurality of networks, a wider address space may be allocated.

Therefore, with IPv6, the attack by an malicious user to deplete resources can not be avoided simply by comparing addresses, a conventional procedure employed with IPv4.

SUMMARY OF THE INVENTION

It is therefore an object of the invention is to provide a communication control apparatus, a communication control method and a communication control program product.

In order to achieve the object, according to a first aspect of the invention, there is provided a communication control apparatus including: a connection request receiver configured to receive a connection request for connecting to a server from a specific communication apparatus connected to a network; a storage device configured to store information concerning an identifier for the specific communication apparatus, the information included in the connection request; a first detector configured to determine whether or not the identifier falls within a predetermined range; a second detector configured to determine whether the connection request consumes a predetermined amount or more of communication resources; and a connection controller configured to restrict the connection request received from other communication apparatuses that includes identifiers falling within the predetermined range as the identifier of the specific communication apparatus, when the second detector determines that the connection request consumes the predetermined amount or more of the communication resources.

According to a second aspect of the invention, there is provided a communication control method including: receiving a connection request for connecting to a server from a specific communication apparatus connected to a network; storing information concerning an identifier for the specific communication apparatus, the information included in the connection request; determining whether or not the identifier falls within a predetermined range; determining whether the connection request consumes a predetermined amount or more of communication resources; and restricting the connection request received from other communication apparatuses that includes identifiers falling within the predetermined range as the identifier of the specific communication apparatus, when the connection request is determined to consume the predetermined amount or more of the communication resources.

According to a third aspect of the invention, there is provided a communication control program product for causing a computer, which is located between a specific communication apparatus connected to a network and a server that performs a server process and a communication process, to execute procedures including: means for receiving a connection request for connecting to a server from a specific communication apparatus connected to a network; means for storing information concerning an identifier for the specific communication apparatus, the information included in the connection request; means for determining whether or not the identifier falls within a predetermined range; means for determining whether the connection request consumes a predetermined amount or more of communication resources; and means for restricting the connection request received from other communication apparatuses that includes identifiers falling within the predetermined range as the identifier of the specific communication apparatus, when the connection request is determined to consume the predetermined amount or more of the communication resources.

According to a fourth aspect of the invention, there is provided a communication control program product for causing a computer, which performs a server process and a communication process for a specific communication apparatus connected thereto via a network, to execute procedures including: means for receiving a connection request for connecting to a server from a specific communication apparatus connected to a network; means for storing information concerning an identifier for the specific communication apparatus, the information included in the connection request; means for determining whether or not the identifier falls within a predetermined range; means for determining whether the connection request consumes a predetermined amount or more of communication resources; and means for restricting the connection request received from other communication apparatuses that includes identifiers falling within the predetermined range as the identifier of the specific communication apparatus, when the connection request is determined to consume the predetermined amount or more of the communication resources.

BRIEF DESCRIPTION OF THE DRAWINGS

The above objects and advantages of the present invention will become more apparent by describing in detail exemplary embodiments thereof with reference to the accompanying drawings, wherein:

FIG. 5 is diagram showing weight data stored in a weight storage device;

FIG. 6 is a diagram showing weight determination data stored in a weight determination storage device;

FIG. 9 is a diagram showing weight history data stored in a weight history storage device;

DETAILED DESCRIPTION OF THE PREFERRED EMBODIMENTS

Referring now to the accompanying drawings, a description will be given in detail of embodiments of the invention.

First Embodiment

<Communication Connection System>

Figure 1:
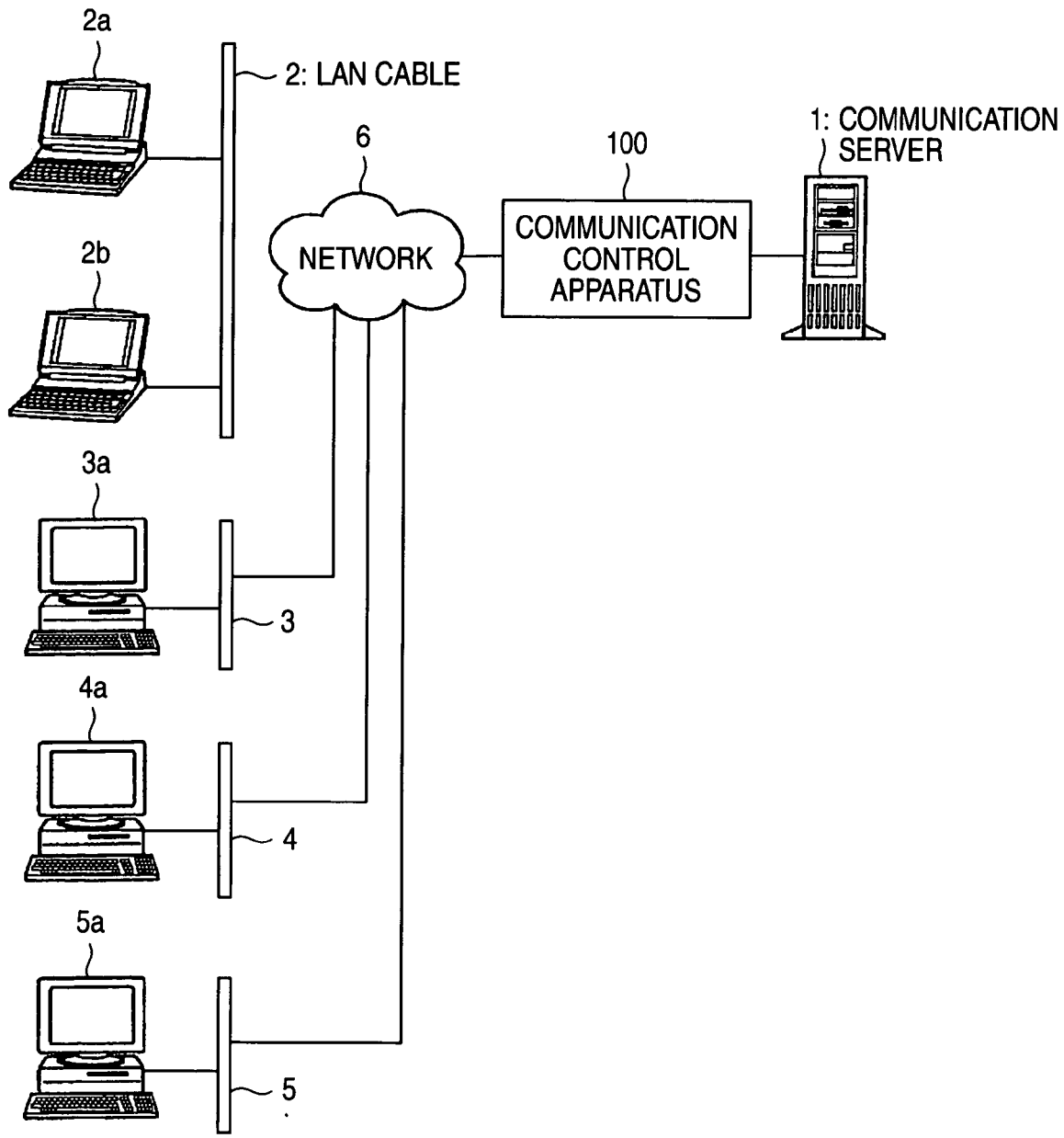
FIG. 1 is a schematic diagram showing a system employing a communication control apparatus according to a first embodiment of the invention.

As is shown in FIG. 1, a communication connection system according to a first embodiment of the invention includes: a communication control apparatus 100; a communication server 1; communication apparatuses 2a and 2b connected to a LAN cable 2; a communication apparatus 3a connected to a LAN cable 3; a communication apparatus 4a connected to a LAN cable 4; a communication apparatus 5a connected to a LAN cable 5; and a network 6 for connecting these communication apparatuses to the communication server 1. The network 6 is a communication network, such as the Internet, for performing data transmission through a communication medium, regardless of a wireless or wire medium.

The communication apparatuses 2a, 2b, 3a, 4a and 5a, respectively connected to the LAN cables 2, 3, 4 and 5, request connections to the communication server 1. In the connecting, the communication control apparatus 100 monitors the connection to determine whether one of the communication apparatuses 2a, 2b, 3a, 4a and 5a frequently and unnecessarily issues connection requests and employs a large amount of software resources (simply, "resources") of the communication server 1. During the monitoring process, the communication control apparatus 1 adds a "weight" to a transmission source address for a packet, and employs the weighted address to measure the deviation of the transmission sources for the packet, i.e., each time a packet that consumes resources is received from the same transmission source, the communication control apparatus 100 increases the weight of the transmission source address. Further, in accordance with the weight, the communication control apparatus 100 decides which processing to perform for each of the transmitting packet. For example, when a packet has a very heavy weight, the communication control apparatus 100 determines that the packet was sent from a communication apparatus that has frequently issued unnecessary connection requests, the communication control apparatus 100 abandons the connection request from the communication apparatus, instead of transmitting it to the communication server 1. It should be noted that the function of the communication control apparatus 100 is carried out by installing in a computer a software program that provides the pertinent function.

<Communication Control Apparatus>

Figure 2:
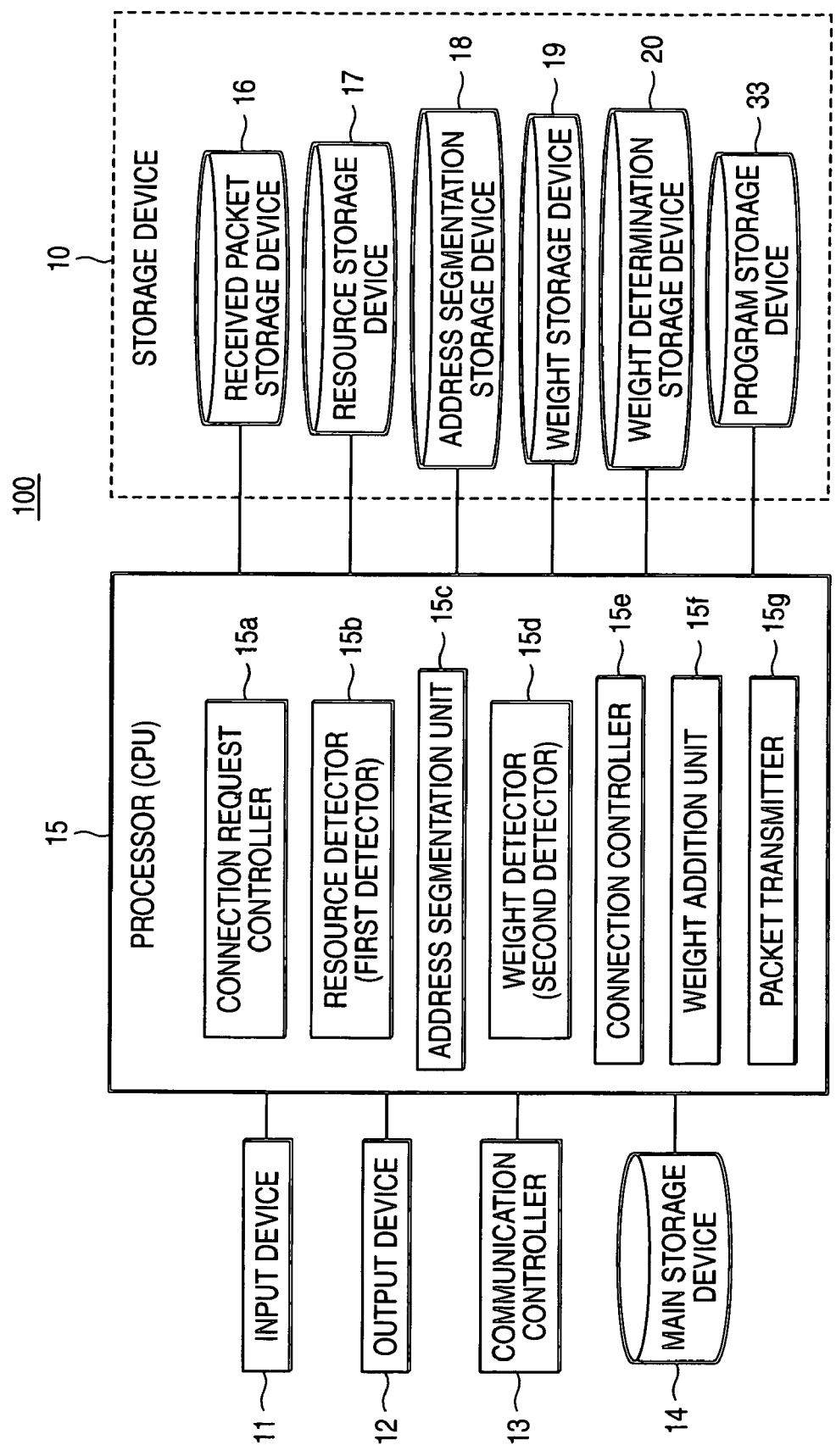
FIG. 2 is a diagram showing the configuration of the communication control apparatus according to the first embodiment.

As shown in FIG. 2, the communication control apparatus 100 according to the first embodiment of the invention includes: a storage device 10, an input device 11, a communication control apparatus 13, a main storage device 14 and a processor (CPU) 15. The storage device 10 includes a received packet storage device 16, a resource storage device 17, a packet segmentation storage device 18, a weight storage device 19, a weight determination storage device 20, and a server process storage device 33.

The received packet storage device 16 temporarily stores packets received from the communication apparatuses 2a, 2b, 3a, 4a and 5a requesting connections. The resource storage device 17 stores resource category data for a received packet.

The packet segmentation storage device 18 stores an address structure for defining the segmentation position of an address held by a packet. The weight storage device 19, as shown in FIG. 5, stores the current weight of a packet segment, and a weighting variable for each packet segment and the weight obtained by the weighting. The weight determination storage device 20 stores a reference value table for determining whether the detected weight is a reference value, or larger or smaller, and also to store a process to be performed for the packet based on the determination results. The server process storage device 33 stores a program executed by the CPU 15.

The CPU 15 includes a connection request receiver 15a, a resource detector 15b, an address segmentation unit 15c, a weight detector 15d, a connection controller 15c, a weight addition unit 15f and a packet transmitter 15g.

The connection request receiver 15a is a module for receiving connection requests issued by the communication apparatuses 2a, 2b, 3a, 4a and 5a. The resource detector 15b corresponds to a first detector of the invention, i.e., a module for detecting the resources for a received packet. When a received packet is a synchronize flag packet (SYN packet), the resource detector 15b determines that the resource category for the SYN packet is TCP because the SYN packet indicates it is a request for establishing a TCP connection. The address segmentation unit 15c then splits the received packet, based on the packet segmentation data stored in the packet segmentation storage device 18, by referring to the feature of the address structure. For an example in FIG. 3, a packet of 128 bits is simply split, at the 48-th bit and the 64-th bit, into three segments, i.e., a P1 area of 48 bits, a P2 area of 16 bits and a P3 area of 64 bits. In an example in FIG. 4, a packet is split into three segments at the 48-th bit and the 64-th bit and, beginning with the first bit, a cumulative value, is obtained. Thus, the P1 area of 48 bits, the P2 area of 64 bits and the P3 area of 128 bits are obtained.

The weight detector 15d corresponds to a second detector of the invention, i.e., a module for determining whether a connection request will consume a predetermined amount or more, and for determining whether information concerning an address, which is stored in the storage device 10, is based on the address of the communication apparatus or a communication apparatus that belongs to a neighboring network. Specifically, the weight detector 15d employs the data in the weight storage device 19 to detect the weight of the transmission source address for a received packet, and employs the weight to determine whether the packet will consume a constant amount of resources or more, or was received from the same communication apparatus or a communication apparatus that belongs to a neighboring network. Since the upper network portion of an IPv6 address can be rewritten, a packet may be transmitted from the unauthorized communication apparatus by using a false address indicating a neighboring network. The connection controller 15e is a module for employing the detected weight of the transmission source address to determine whether the transmission source should be connected to the communication server 1. The weight addition unit 15f is a module for, in a case where it is ascertained that the weight of the transmission source address falls within an appropriate range and the packet is therefore transmitted to the communication server 1, adding a new weight to the weight of the transmission source address. The packet transmitter 15g is a module for transmitting, to the communication server 1, the received packet for which the connection is permitted, e.g., the SYN packet.

The input device 11 is an interface for receiving packets, such as SYN packets, from the communication apparatuses 2a, 2b, 3a, 4a and 5a. The output device 12 is an interface for transmitting, to the communication server 1, packets such as SYN packets for which a connection is permitted. The communication control apparatus 13 generates a control signal for exchanging a packet with a router and a node, such as another communication apparatus, using wireless communication or a wire communication line. The main storage device 14 is used to temporarily store program data wherein the procedures are written and packet data to be processed, and from the main storage device 14, machine instructions for the program or the data are transmitted upon the reception of a request from the CPU 15. The main storage device 14 and the CPU 15 are interconnected by an address bus, a data bus and a control signal line.

(Communication Control Method)

Figure 7:
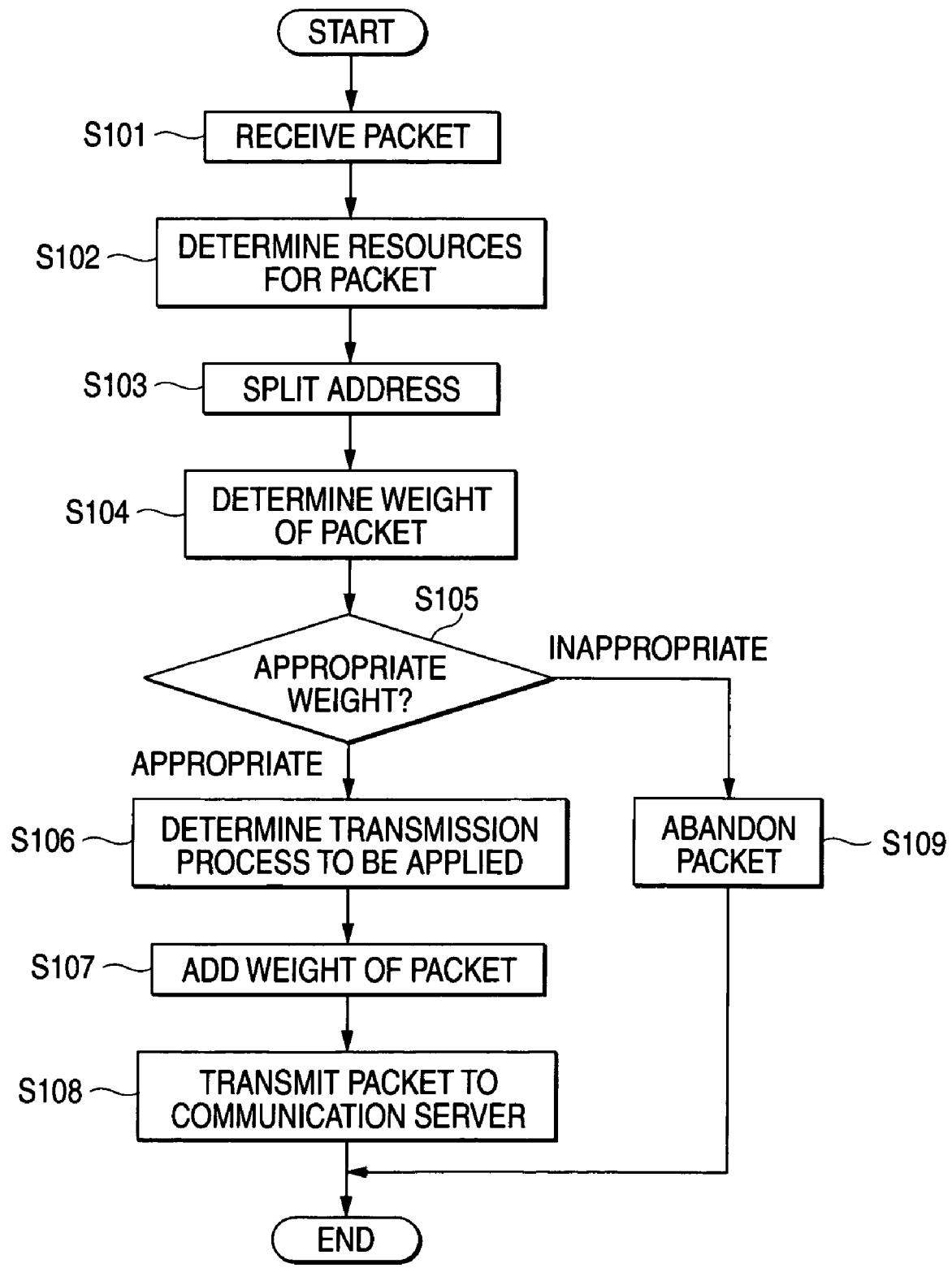
FIG. 7 is a flowchart showing the operation of the communication control apparatus.

The operation of the communication control apparatus 100 will now be described while referring to FIG. 7.

In step S101, the connection request receiver 15a of the communication control apparatus 100 receives a packet from the communication apparatus 2a, 2b, 3a, 4a or 5a, and temporarily stores the packet in the received packet storage device 16.

In step S102, the resource detector 15b extracts a packet that is temporarily stored in the received packet storage device 16, and detects the resource category for this packet. When the packet is an SYN packet, the resource detector 15b determines that the resource category for the packet is the TCP resource category.

Figure 3:
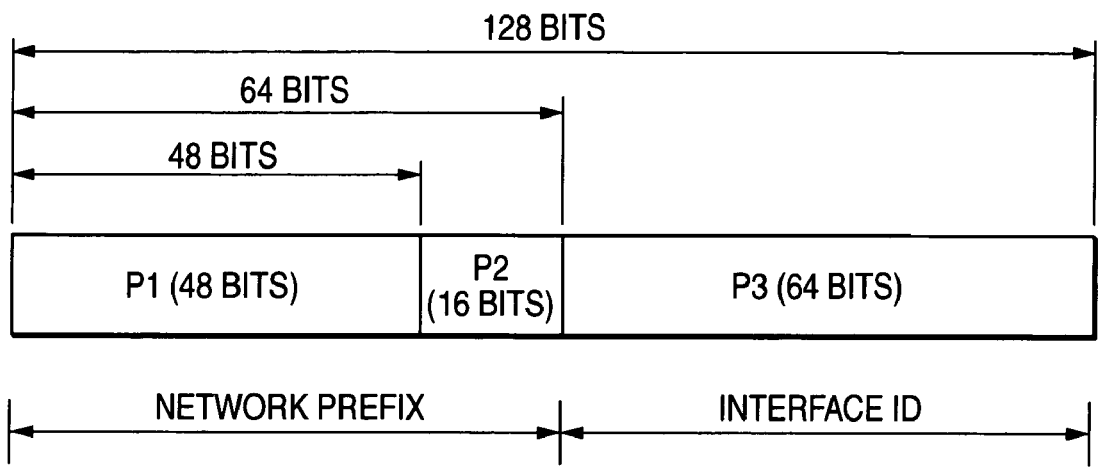
FIG. 3 is a diagram showing the data structure of an IPv6 address.
Figure 4:
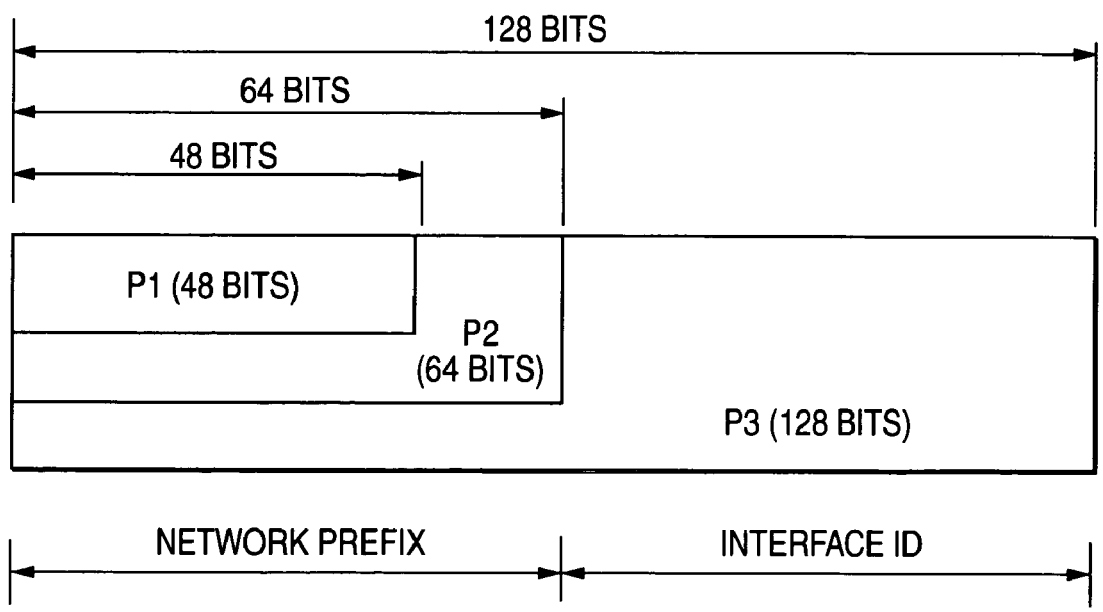
FIG. 4 is a diagram showing the data structure of the IPv6 address.

In step S103, the address segmentation unit 15c employs the data in the packet segmentation storage device 18 to split the transmission source address of the received packet into segments, as shown in FIGS. 3 and 4.

In step S104, the weight detector 15d employs the data in the weight storage device 19 to detect the weight of each segment of the received packet, e.g., the current weights "P1:1, P2:2 and P3:3", of the segments shown as (a) in FIG. 5, that are stored in the weight storage device 19.

In step S105, the connection controller 15e determines whether the current weight of each segment that is detected falls within a reference value. The reference value is previously set.

When the connection controller 15e determines that the weight falls within the reference value, in step S106, the connection controller 15e decides what transmission process to be applied for the packet having a specific characteristic even though the weight of the packet is within the reference value. The transmission process to be applied is decided based on the reference value table in the weight determination storage device 20 in FIG. 6. One example of the deciding of the transmission process will be described hereinafter. When a weight of the packet differs largely while the weight is within the reference value during a unit time period, i.e., when over a short period of time packets are collectively received from a specific communication apparatus, the connection controller 15e determines that the probability of malicious activity is high, and greatly delays the transmission of the packet to the communication server 1. When the weight of the packet is larger than the current weight average, i.e., when the number of times packets are received is slightly greater than that for another communication apparatus, the connection controller 15e determines that the probability of malicious activity is low, and slightly delays the transmission of the packet to the communication server 1. When the weight is smaller than the average weight, the transmission of the packet is performed at normal speed.

In step S107, the weight addition unit 15f adds the weight of the packet based on the "weight" and a "weighting variable for a segment" that are stored in the weight storage device 19. The weighting variable is employed for the addition and multiplication of the reference weight, and the weighting variables for segments P1, P2 and P3 may be equal, or greater weighting may be provided for one segment. For an IPv6 address, the network prefix portion (P1+P2) in FIGS. 3 and 4 employs a variable length for specifying an upper network. Whereas, since the interface ID portion (P3) is prepared based on MAC addresses uniquely provided for the communication apparatuses 2a, 2b, 3a, 4a and 5a, the communication apparatuses 2a, 2b, 3a, 4a and 5a can be identified. That is, when P1 and P1+P2 are the same for the packet, it can be assumed that the packet originated at a communication apparatus that is present in the same or a neighboring network, and when P1+P2+P3 are the same, it can be assumed that the packet originated at the same communication apparatus. Therefore, it is preferable that weighting be performed in the manner represented by P1≦P2≦P3. As shown as (c) in FIG. 5, the weights obtained through the weighting process are P1: 1(1*1), P2: 2(1*2) and P3: 6(2*3).

Before the calculation of the weight, an inquiry may be issued to the communication server 1, as for all transmission source addresses for which resources are currently being consumed, and a communication apparatus for which it is determined the probability it will mount an attack is high may be specified and its address stored in the received packet storage device 16.

Finally, in step S108, the packet transmitter 15g transmits to the communication server 1 the packet.

Since the communication control apparatus 100 in the first embodiment of the invention performs the resource detection and the weight detection, the authorization of the packet transmission source can be examined. Further, based on the verification, the connection controller can limit connection requests, e.g., the reception of an inappropriate connection request may be rejected, so that the mounting, by a malicious user, of an attack for depleting the resources can be avoided.

The communication control apparatus 100 may be embedded in a bridge or a router. Further, in order to protect the communication server 1, the communication control apparatus 100 may employ another unique method to process a packet addressed to the communication server 1, or may notify the communication server 1 of the weight of a received packet. For the notification, a method can be employed for rewriting the value of a flow label or a traffic class. In addition, the communication control apparatus 100 may employ a service management method such as DiffServ (Differentiated Servicess), to control the traffic to the communication server 1. As an example, when a party in charge of maintenance for the communication server 1 and the communication control apparatus 100 and a party that mounts an attack belong to neighboring networks, the attack is mounted even when the communication control using the weighting is exercised. Therefore, the communication control apparatus may include an area for accepting the connection request so long as a specific condition is satisfied, regardless of the weight. As a specific method, so long as IP sec is correctly performed, the connection request is received even from the "heavy" transmission source address. In this case, it is more effective to use the system explained in a second embodiment, wherein the communication control apparatus 100 is mounted in the communication server 1.

Second Embodiment

<Communication Connection System>

A server 200 implementing communication control that is equivalent to the server 1 wherein the communication control apparatus 100 in FIG. 1 is mounted is described hereinafter as a second embodiment of the invention. Since the other apparatuses are the same as those for the communication connection system of the communication control apparatus 100 in FIG. 1, no further explanation for them will be given.

<Server Implementing Communication Control>

Figure 8:
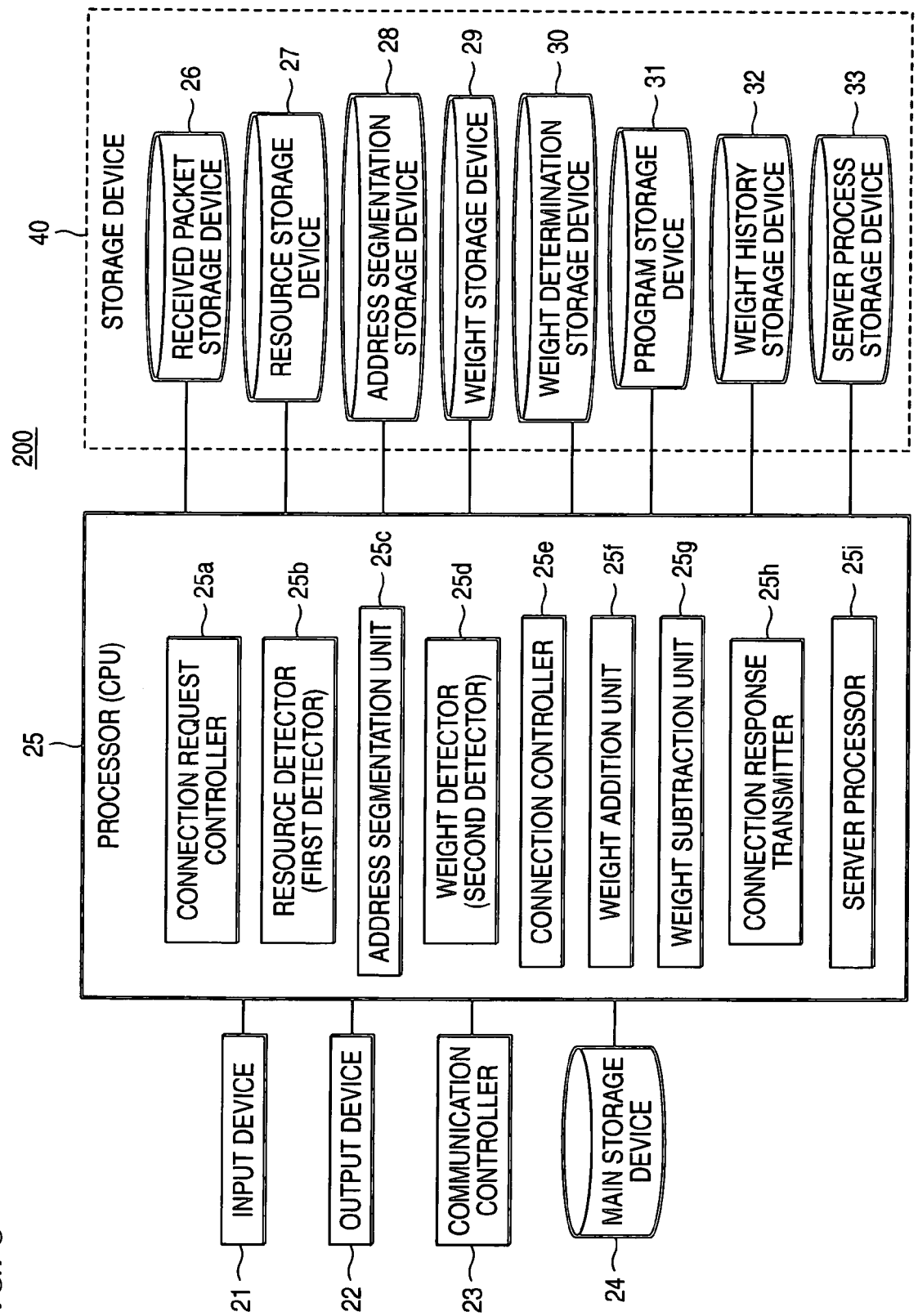
FIG. 8 is a diagram showing the configuration of a server implementing communication control according to a second embodiment of the invention.

As is shown in FIG. 8, the server 200 implementing communication control according to the second embodiment includes: a storage device 40, an input device 21, an output device 22, a communication control apparatus 23, a main storage device 24 and a processor (CPU) 25.

The storage device 40 includes a received packet storage device 26, a resource storage device 27, a packet segmentation storage device 28, a weight storage device 29, a weight determination storage device 30, a program storage device 31, a weight history storage device 32 and a server process storage device 33.

As is shown in FIG. 9, the weight history storage device 32 is used to store, for each unit time period, changes in the weight of packets received from a transmission source that belongs to the same or a neighboring network, i.e., the history of the weights.

The server process storage device 33 is used to store information required to establish a normal client server connection, and to perform a constant service process for a communication terminal.

The CPU 25 includes a connection request receiver 25a, a resource detector 25b, an address segmentation unit 25c, a weight detector 25d, a connection controller 25e, a weight addition unit 25f, a weight subtraction unit 25g, a connection response transmitter 25h and a server processor 25i. The weight subtraction unit 25g is a module for reducing the weight of a transmission source address when it is ascertained that the weight of the source address falls within an appropriate range and a packet is transmitted to the communication server 1. The server processor 25i is a module for establishing a normal client server connection, and for performing a constant service process for a communication terminal. Since the other units are the same as those for the first embodiment, no further explanation for them will be given.

<Communication Control Method>

Figure 10:
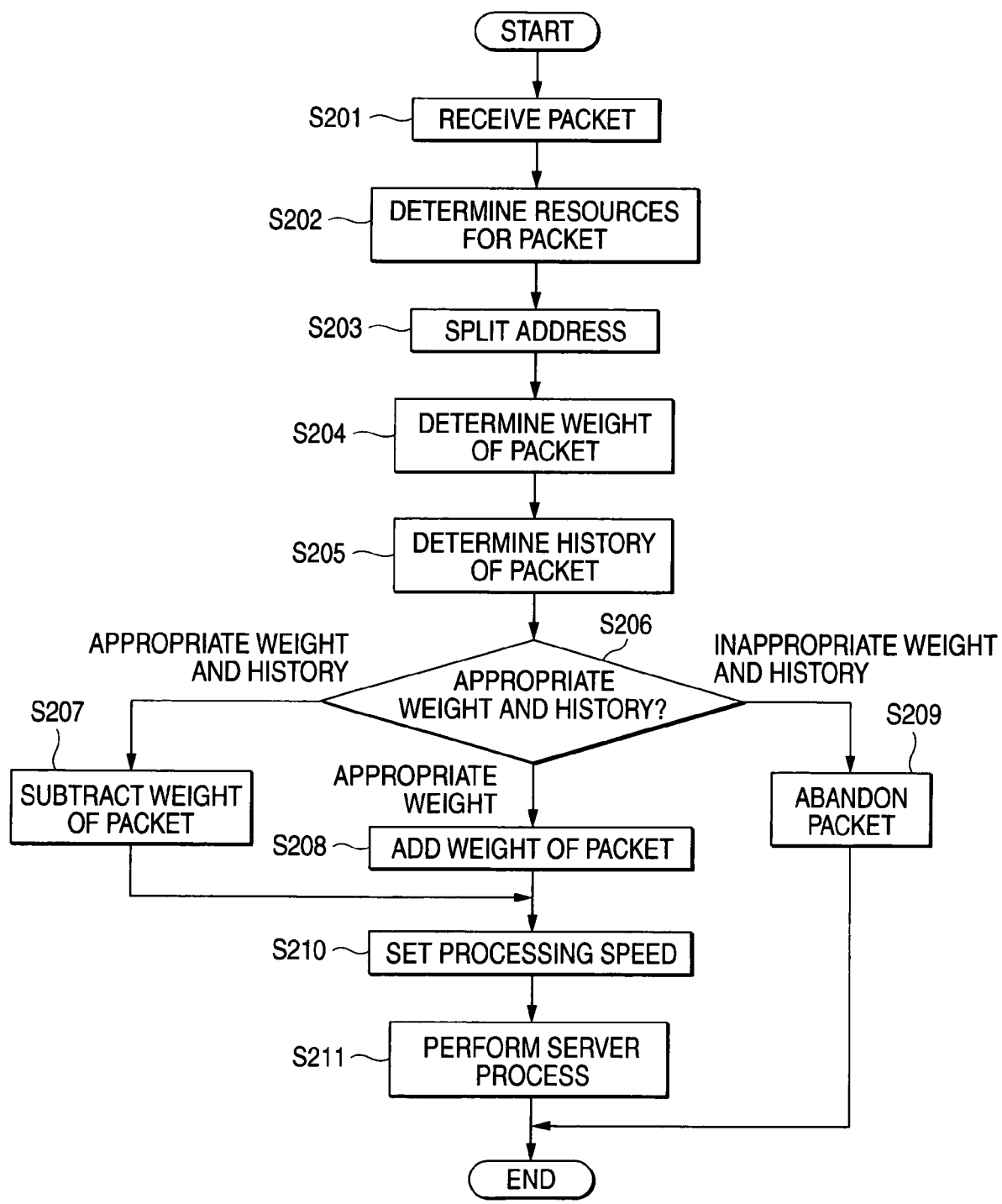
FIG. 10 is a flowchart showing the operation of the server implementing communication control.

The operation of the server 200 implementing communication control will now be described while referring to FIG. 10.

In step S201, the connection request receiver 25a of the server 200 receives a packet from the communication apparatuses 2a, 2b, 3a, 4a or 5a, and temporarily stores the packet in the received packet storage device 26.

In step S202, the resource detector 25b extracts a packet that is temporarily stored in the received packet storage device 26, and detects the resource category for this packet.

In step S203, the address segmentation unit 25c employs the information in the packet segmentation storage device 28 to split the transmission source address of the received packet into the segments shown in FIGS. 3 and 4.

In step S204, the weight detector 25d employs the data in the weight storage device 29 to detect the weight of each segment in the received packet.

In step S205, the weight detector 25d employs the data in the weight history storage device 32 to detect the history of the weight of each segment in the received packet.

In step S206, the connection controller 25e determines whether the weight of the currently detected segment falls within a reference value. The reference value is set in advance. Further, the connection controller 25e determines whether the history of the weight is appropriate. In this determination, for example, the connection controller 25e determines whether the weight is the result of a number of packets exceeding the normal range being received, over a period of several seconds, from a communication apparatus that belongs to the same or a neighboring network, or is simply the result of packets within the normal range being received.

When in step S206 the weight falls within the reference value and the weight history is normal, it is assumed in step S207 that, for some reason, merely connection requests were concentrated on over a constant period of time, and the weight subtraction unit 25g reduces the weight of the packet.

When the weight falls within the reference value in step S206, in step S208 the weight addition unit 25f adds the weight of the packet. The weighting is performed based on the "weight" and the "weighting variable of a segment" that are stored in the weight storage device 29.

When, in step S206, the weight exceeds the reference value and the weight history is abnormal, it is assumed in step S209 that the communication apparatus at the packet transmission source has mounted a malicious attack and the packet is abandoned.

In step S207, the server processor 25i creates a connection response packet, such as an acknowledgement (ACK) packet or an ACK/SYN packet.

In step S210, even when the weight falls within the reference value in steps S207 and S208, the data in the weight determination storage device in FIG. 6 are employed to set the processing condition employed by the server processor 25i for a packet it has been found has a specific characteristic. Thereafter, in step S211 the connection response transmitter 25h transmits the connection response packet to the transmission source address for the received packet.

According to the server 200 according to the second embodiment in which implementing communication control, since the detection of the resource, the weight and the weight history is performed, whether the packet transmission source is authorized and whether the source has mounted a malicious attack can be specifically examined. Further, based on the examination results, the connection controller can impose limits on the acceptance of connection requests, e.g., a request by a malisious user for an inappropriate connection can be rejected, so that the mounting of a malicious attack to deplete resources can be avoided.

Since the server 200 includes the communication control function and the server function, responsibility can easily be assigned for the security associated with determining the authorization for the IPsec payload. Therefore, as one example method, even if an attack is mounted when the side responsible for the maintenance of the communication server and the communication control apparatus and the side mounting an attack thereon belong to neighboring networks, so long as the attack satisfies a specific condition, the connection request is accepted, regardless of the weight. Specifically, so long as the IPsec is correctly performed, even a connection request from a "heavy" transmission source address is accepted.

<Example Weight Calculation>

Figure 11:
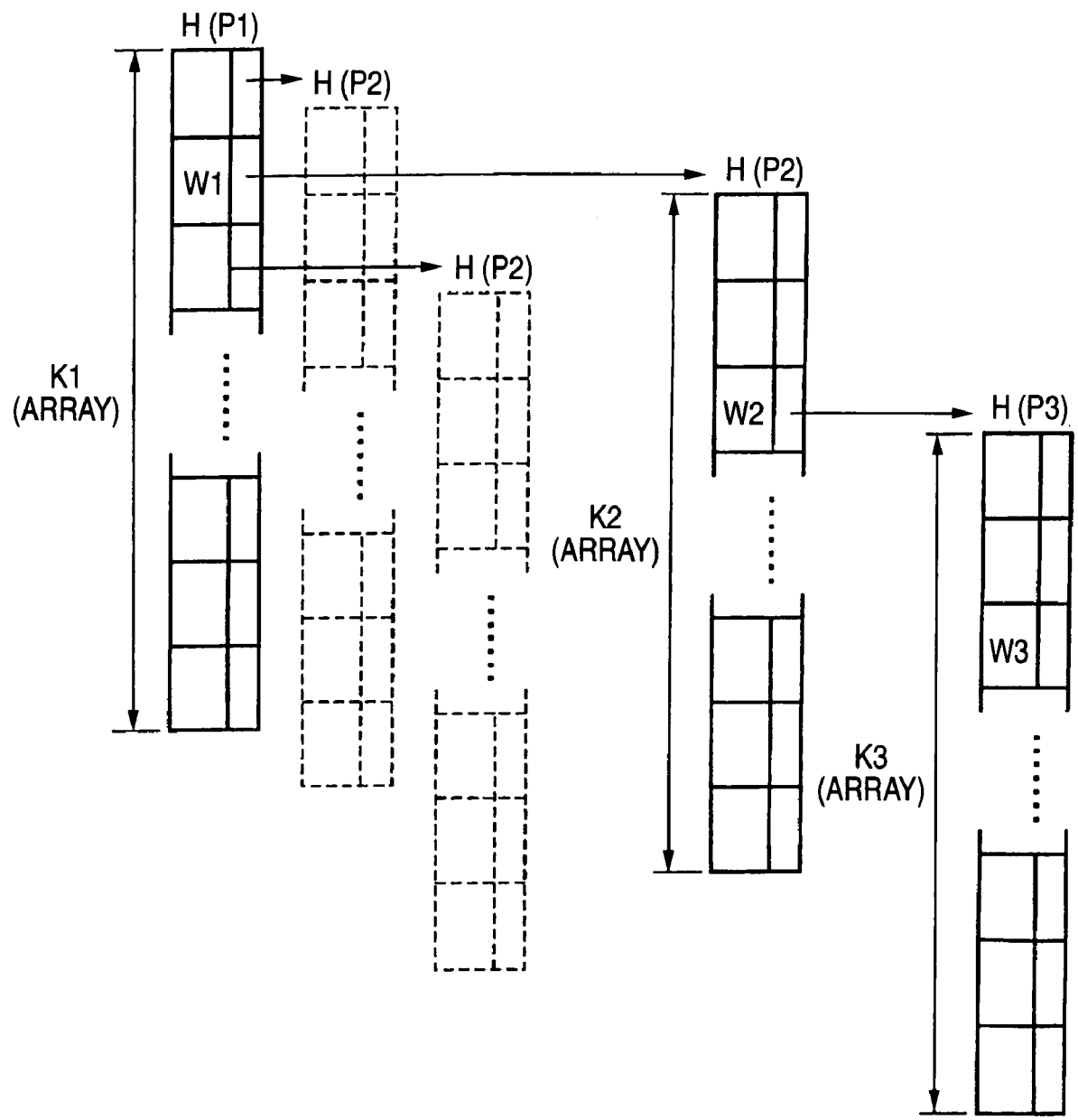
FIG. 11 is a diagram showing a weight management table prepared by performing hash calculations.

For a communication server that receives many connection requests from the communication apparatuses 2a, 2b, 3a, 4a and 5a, the ratio for the weighting process is greatly increased. Therefore, a preferable method is for the weight to be approximately but efficiently calculated, even when there is a slight shift in the weight. As an example, a calculation method employing a hash table will be explained while referring to FIG. 11.

First, for a specific packet, hash tables for P1, P2 and P3 are prepared. In the hash tables, a calculation is performed to obtain values for P1, P2 and P3, which are represented by a small, finite bit length "k". That is, the index value for the array in the hash table is defined as "k". Thereafter, the value H(P1) obtained by performing a calculation for P1, the value H(P2) obtained by performing a calculation for P2 and the value H(P3) obtained by performing a calculation for P3 are entered in the array. When the numerical values for the P1, P2 and P3 addresses are simply split, as shown in FIG. 3, for the calculations, a hash table having a tree structure is prepared. But when, as shown in FIG. 4, the numerical values for the P1, P2 and P3 addresses have been accumulated, three hash tables, one each for P1, P2 and P3, are prepared.

The number of times (equals to the value of the weight in the embodiment) whereby the hash calculation was passed through the area P1 is written in the hash table for P1. That is, the number of times the calculation was passed through the same array in the hash table is directly employed as the value for the weight. When the index for the array is 3, and includes addresses (0) (1) and (2), and when the calculation was passed through address (1) one time, a weight of 1 is entered in the hash table. When the calculation was passed through address (2) two times, a weight of 2 is entered in the hash table. And when the calculation was passed through address (3) three times, a weight of 3 is entered in the hash table. Then, the value for the weight is added to a weight storage area (not shown) and stored. The value for this weight is defined as W1.

Further, the position (e.g., the pointer to the pertinent area) in the hash table for H(P2) is entered in the hash table of P1. In accordance with this position, the operation is shifted to the next hash table H(P2).

In the hash table for P2, the number of times (equals the value of the weight) the hash calculation was passed through the pertinent area is entered. Then, the value of the weight is added to the weight storage area (not shown) and stored. This weight value is defined as W2. In addition, the position (e.g., the pointer to the pertinent table) in the hash table H(P3) is written in the hash table for P2. In accordance with this position, the operation is shifted to the hash table H(P3).

In the hash table for P3, the number of times (equals the value of the weight) the hash calculation was passed through the pertinent area is entered. Then, the value of the weight is added to the weight storage area (not shown) and stored. This weight value is defined as W3.

That is, the weighting variables for the segments shown as (b) in FIG. 5 are employed, and a weight represented by the following Equation (1) is entered in the weight storage area.

$$\text{weight} = W1*(\text{the weighting variable for } P1) + \\ W2*(\text{the weighting variable for } P2) + \\ W3*(\text{the weighting variable for } P3) \quad \text{Equation (1)}$$

For the weight detection, the weights of the individual areas W1, W2 and W3 may be calculated. In this example, the weights are simply increased by the same amount, and the calculation of the weight is performed while taking weighting into account as shown in Equation (2).

$$\text{weight} = W1*1 + (W2*2) + (W3*3) \quad \text{Equation (2)}$$

Another method may simply be obtained, by increasing the weight while taking the addition of the weights into account as shown in Equation (3).

$$\text{weight} = W1 + W2 + W3 \quad \text{Equation (3)}$$

Furthermore, when a received packet is regarded as a packet for releasing resources, e.g., an FIN packet for which the resource category is TCP, the weight of the transmission source address for this packet is reduced. For the weight reduction, the same method may be employed as is used for increasing the weight, or another method may be employed.

Since the weight calculation method in the embodiment is employed to detect the weight, whether the packet transmission source is authorized or whether a malicious attack has been mounted can be specifically determined. In addition, based on the examination results, limits can be imposed on the acceptance of connection requests, e.g., an inappropriate connection request can be rejected.

Moreover, in accordance with the method that reducing the weight, when a malisious user is mounting a malicious attack, the server 200 implementing communication control can identify this attack and maintain the server in a heavily loaded state and prevent its resources from being depleted.

According to the invention, provided are a communication control apparatus, a communication method and a communication control method that during communications for which IPv6 addresses are used, transmission source authorizations are examined and inappropriate connection requests are rejected, so that an attack from a malicious user to deplete resources is prevented.

Although the present invention has been shown and described with reference to specific embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A communication control apparatus connected between a server and a communication apparatus connected to the server via a network, the communication control apparatus comprising:
    a storage device configured to store corresponding weighted values for each of a plurality of predetermined portions of a sender address assigned to a packet received from the communication apparatus, the weighted values determined based on a number of packets received from the communication apparatus during a predetermined time period;
    a connection request receiver configured to receive a connection request packet including a connection request to the server from the communication apparatus;
    a weight detector configured to obtain a weighted value corresponding to a part of the sender address assigned to the connection request packet received by the connection request receiver from among the weighted values stored in the storage device;
    a connection controller configured to
        reject the connection request, when the obtained weighted value exceeds a predetermined value, by determining that the communication apparatus consumes more than a predetermined amount of a resource of the server and discarding the connection request packet, and
        allow the connection request when the obtained weighted value falls within a predetermined range that is lower than the predetermined value and decide a transmission process to apply to the connection request packet based on the predetermined value;
    a weight updater configured to update the weighted values stored in the storage device by adding an additional weight calculated by a predetermined calculation to the obtained weighted value; and
    a packet transmitter configured to transmit the connection request packet to the server when the connection controller allows the connection request.

2. The communication control apparatus according to claim 1, wherein the sender address is an IPv6 address, and the predetermined portion of the sender address is a part or all of a network prefix.

3. The communication control apparatus according to claim 1, wherein the connection is further configured to allow the connection request when the connection request packet is determined to be valid connection request.

4. The communication control apparatus according to claim 1, wherein
    the storage device is further configured to store a history of the weighted values,
    the weight updater is further configured to update the weighted values stored in the storage device by adjusting the obtained weighted value to increase or to decrease in accordance with the history of the weighted values, and
    the connection controller is further configured to reject or to allow the connection request based on the obtained weighted value to be adjusted by the weight updater.

5. The communication control apparatus according to claim 1, wherein the weight updater is further configured to calculate the additional weight top be added to the obtained weighted value by a hash process.

6. A method for controlling a communication by a communication control apparatus connected between a server and a communication apparatus connected to the server via a network, the method comprising:
    storing corresponding weighted values for each of a plurality of predetermined portions of a sender address assigned to a packet received from the communication apparatus, the weighted values determined based on a number of packets received from the communication apparatus during a predetermined time period;
    receiving a connection request packet including a connection request to the server from the communication apparatus;
    obtaining a weighted value corresponding to a part of the sender address assigned to the received connection request packet from among the stored weighted values;
    rejecting the connection request, when the obtained weighted value exceeds a predetermined value, by determining that the communication apparatus consumes more than a predetermined amount of a resource of the server and discarding the connection request packet;
    allowing the connection request and deciding a transmission process to apply to the connection request packet based on the predetermined value, when the obtained weighted value falls within a predetermined range that is lower than the predetermined value;
    updating the stored weighted values by adding an additional weight calculated by a predetermined calculation to the obtained weighted value; and
    transmitting the connection request packet to the server when the connection request is allowed.

7. The method according to claim 6, wherein the sender address is an IPv6 address, and the predetermined portion of the sender address is a part or all of a network prefix.

8. The method according to claim 6, wherein the connection request is allowed when the connection request packet is determined to be a valid connection request.

9. The method according to claim 6, further comprising:
storing a history of the weighted values;
updating the stored weighted values by adjusting the obtained weighted value to increase or to decrease in accordance with the history of the weighted values, and
determining to reject or allow then connection request based on the obtained weighted value to be adjusted.

10. The method according to claim 6, wherein the additional weight to be added to the obtained weighted value is calculated by a hash process.

11. A computer-readable medium including computer executable instructions, wherein the instructions, when executed by a computer connected between a server and a communication apparatus connected to the server via a network, cause the computer to perform a process for controlling communication between the communication apparatus and the server, the process comprising:
storing corresponding weighted values for each of a plurality of predetermined portions of a sender address assigned to a packet received from the communication apparatus, the weighted value determined based on a number of packets received from the communication apparatus during a predetermined time period;
receiving a connection request packet including a connection request to the server from the communication apparatus;
obtaining a weighted value corresponding to a part of the sender address assigned to the received connection request packet from among the stored weighted values;
rejecting the connection request, when the obtained weighted value exceeds a predetermined value, by determining that the communication apparatus consumes more than a predetermined amount of a resource of the server and discarding the connection request packet;
allowing the connection request and deciding a transmission process to apply to the connection request packet based on the predetermined value, when the obtained weighted value falls within a predetermined range that is lower than the predetermined value;
updating the stored weighted values by adding an additional weight calculated by a predetermined calculation to the obtained weighted value; and
transmitting the connection request packet to the server when the connection request is allowed.

* * * * *